UNITED STATES PATENT OFFICE.

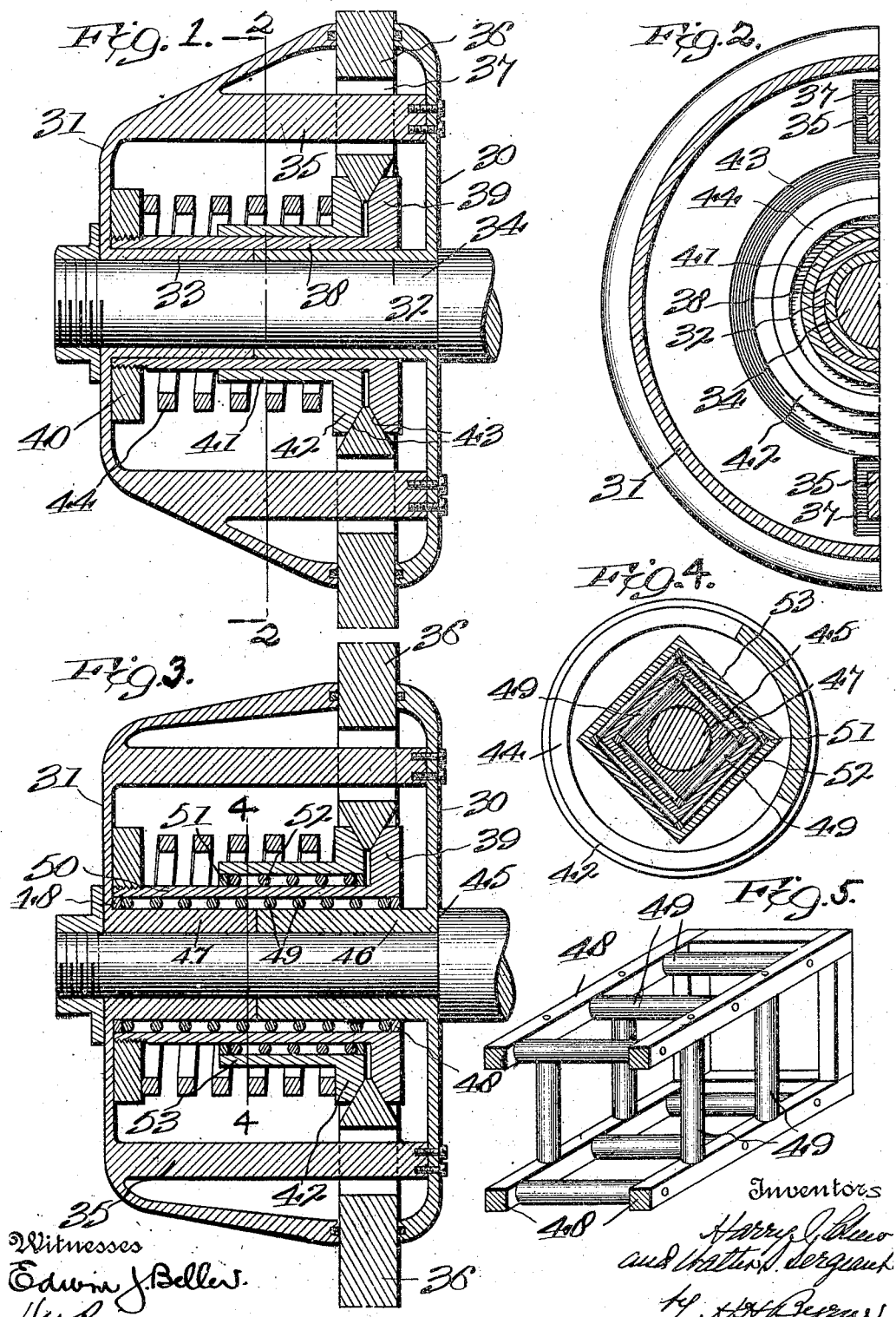

HARRY I. CHEW AND WALTER S. SERGEANT, OF WASHINGTON, DISTRICT OF COLUMBIA, ASSIGNORS, BY DIRECT AND MESNE ASSIGNMENTS, TO HUB SHOCK ABSORBER WHEEL COMPANY, OF LANCASTER, PENNSYLVANIA, A CORPORATION OF PENNSYLVANIA.

RESILIENT WHEEL.

1,149,425.   Specification of Letters Patent.   Patented Aug. 10, 1915.

Application filed June 29, 1914. Serial No. 848,018.

*To all whom it may concern:*

Be it known that we, HARRY I. CHEW and WALTER S. SERGEANT, citizens of the United State of America, residing at Washington, District of Columbia, have invented certain new and useful Improvements in Resilient Wheels, of which the following is a specification.

The present invention relates to resilient wheels for vehicles and consists in the combinations and arrangements of elements hereinafter disclosed and particularly set forth in the accompanying claims.

The invention has for its purpose to provide a wheel having means associated with the hub thereof which serves both as the resilient medium and shock absorber for the vehicle, and wherein all motions incident thereto are transmitted axially of the wheel, to the end of obtaining substantially complete flexibility with maximum rigidity of wheel structure.

Another object of the invention is to provide a novel form of hub for the fore or steering wheel of the vehicle which is of compact design and wholly self contained to the end of decreasing the over-all length of the front axle.

The invention further contemplates a novel form of anti-friction supporting means for the coöperating resilient elements which will afford the required stability to the wheel and at the same time allow complete ease of operation to the working parts.

The present disclosure constitutes an improvement over our invention disclosed in our copending application for United States Patent bearing the Serial No. 839,521 and dated May 18, 1914.

The invention is shown by way of illustration in the accompanying drawings:

Figure 1 is a central sectional view of the hub. Fig. 2 is a sectional view taken on the line 2—2 of Fig. 1 and looking in the direction of the arrows. Fig. 3 is a view similar to Fig. 1 and showing the resilient means mounted on anti-friction elements. Fig. 4 is a sectional view taken on the line 4—4 of Fig. 3, and Fig. 5 is a detailed perspective view of the anti-friction device.

In the construction shown the type of hub is designed for the front or steering wheel as distinct from one which is positively driven in any suitable manner, and in this instance the hub consists of a casing comprising sections 30 and 31 having sleeves 32 and 33 respectively that are mounted on the axle 34. The connection between the hub sections 30 and 31 consists of bars 35 formed integral with the part 31 and secured to the part 32 in any suitable manner. The rim 36 of the wheel is cut-away, as at 37 to receive the several rigid connecting members 35. A sleeve 38 is mounted on the sleeves 32 and 33 and has at one end a cone head 39, and at its opposite end is fitted with a nut 40. A second sleeve 41 is mounted to slide on the sleeve 38 and has a cone head 42 that coöperates with the head 39 to receive the relatively angular faces 43 of the wheel rim. The cushioning for the coacting cone heads 39 and 42 consists of a single spring 44 that surrounds the sleeves 38 and 41 and is interposed between the nut 40 and cone head 42. In normal position said spring tends to hold the cone heads in resilient contact to the end of sustaining the wheel rim 36. It will therefore be seen that the resilient medium for the front wheel may be mounted wholly to one side of the wheel rim and that the hub elements provide a rigid sustaining structure.

In the arrangement shown in Figs. 3, 4 and 5 the parts are substantially the same as those disclosed in Figs. 1 and 2 excepting that in the former instance the axle 45 has squared or other polygonal design sleeve sections 46 and 47 mounted thereon. A cage or frame 48 provided with a plurality of rollers 49 is mounted on the sleeve sections 46 and 47 and provides antifriction bearings for the sleeve 50 of the cone head 39. And a second and similarly designed frame 51 having antifriction rollers 52 is mounted on said sleeve 50 and provides bearings for the sleeve 53 of the second cone head 42. The two sleeves 50 and 53 are of the same design in cross-section as the axle 45 as will be understood.

It will be obvious of course that different forms of anti-friction bearing means may be provided in lieu of that disclosed and described herein. And while we have shown and described certain apparatus for accomplishing the result initially stated it is to be understood that we are not limited to the precise details shown but may on the other hand adopt such modifications or changes within the scope of the claims to better suit the end in view.

Having thus described our invention what we claim as new and desire to protect by United States Patent is:

1. In a resilient wheel the combination of a hub having rigidly connected side plates; a resilient element comprising a pair of axially separable members associated with the hub and having telescoping sleeves; and a wheel rim portion entering between and floatingly mounted on said separable members, said side plates engaging with and laterally sustaining the rim portion in substantially radial alinement with the axially separable members, substantially as described.

2. In a resilient wheel the combination of a hub having rigidly connected side plates; a resilient element comprising a pair of axially separable members associated with the hub and having telescoping sleeves; and a wheel rim portion entering between and floatingly mounted on said separable members, said side plates engaging with and laterally sustaining the rim portion at a distance radially remote and in substantially radial alinement with the axially separable members, substantially as described.

3. In a resilient wheel the combination of a hub having rigidly connected side plates; a wheel rim portion fitting between and laterally sustained by the side plates; and a resilient element radially sustaining said rim portion having telescoping sleeve portions located wholly on one side of said rim portion, substantially as described.

4. In a resilient wheel the combination of a hub having rigidly connected side plates; a wheel rim portion fitting between the side plates; a resilient element radially sustaining said rim portion having telescoping sleeves located wholly on one side of said rim portion, and said side plates engaging with and laterally sustaining the rim portion at a distance radially remote and in substantially radial alinement with the rim sustaining element, substantially as described.

5. In a resilient wheel the combination of a hub having rigidly connected side plates; a wheel rim portion fitting between the side plates; a resilient element radially sustaining said rim portion having cone-heads engaging the opposite outer faces of the rim portions and having telescoping sleeves located wholly on one side of said rim portion; and said side plates engaging with and laterally sustaining the rim portion in substantially radial alinement with the cone heads, substantially as described.

6. In a resilient wheel the combination of a hub having rigidly connected side plates; a relatively narrow wheel rim portion having beveled edges fitting between the side plates and laterally sustained thereby; and means radially sustaining the rim portion comprising telescoping sleeves having cone heads engaging said beveled edges; and a resilient member forcing the cone heads together, said sleeves and the resilient member located wholly on one side of the rim portion substantially as described.

7. In a resilient wheel the combination of a hub having rigidly connected side plates; a wheel rim portion having beveled edges fitting between the side plates and laterally sustained thereby; and means radially sustaining the rim portion comprising telescoping sleeves having axially separable cone heads engaging the beveled edges, a shoulder mounted on one of the sleeves and a resilient member seating against said shoulder and the cone head of the other sleeve and acting to force said cone heads together, said sleeves and the resilient member located wholly on one side of the rim portion substantially as described.

8. The combination with an axle, of a resilient wheel comprising a hub closely fitting the axle and providing a chamber; a pair of coöperable cone heads located within said chamber and having telescoping sleeve portions of polygonal cross-section; a resilient device associated with said cone heads; and a wheel rim floatingly mounted on said cone heads, substantially as described.

In testimony whereof we affix our signatures in presence of two witnesses.

HARRY I. CHEW.
WALTER S. SERGEANT.

Witnesses:
JOHN M. GROFF,
WM. R. DE LASHMUTT.

Copies of this patent may be obtained for five cents each, by addressing the "Commissioner of Patents. Washington, D. C."